April 14, 1970   H. I. HENDERSON   3,505,753
ANIMATED FISHING LURE AND CHILD'S TOY
Filed May 9, 1967
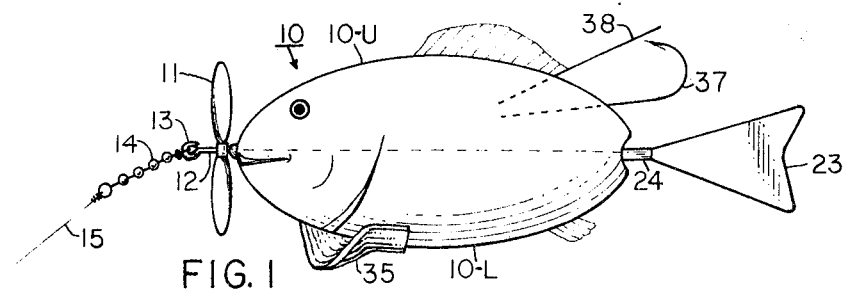
FIG. 1
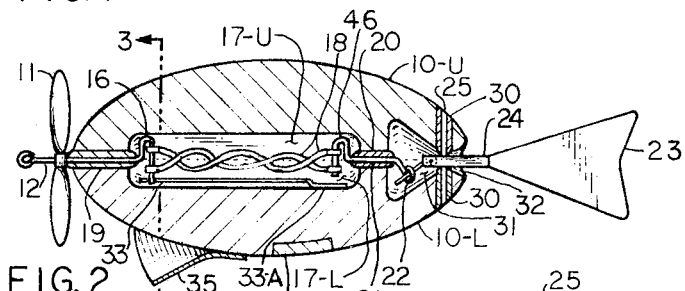
FIG. 2
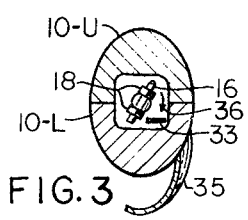
FIG. 3
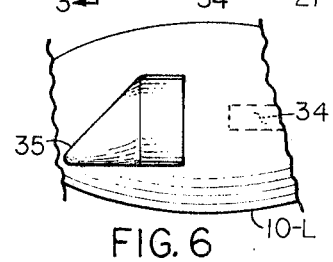
FIG. 6
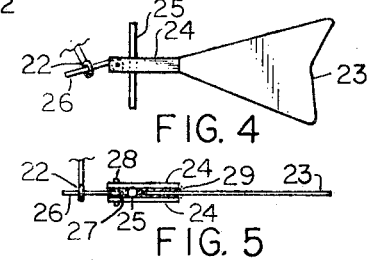
FIG. 4
FIG. 5
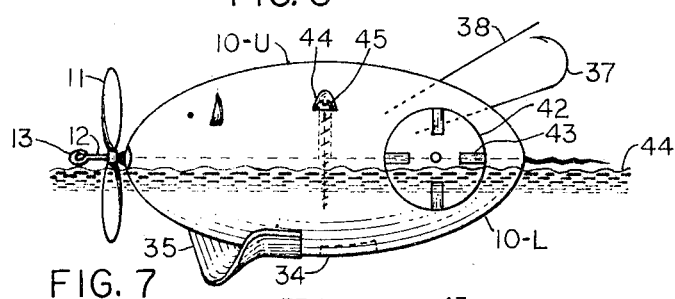
FIG. 7
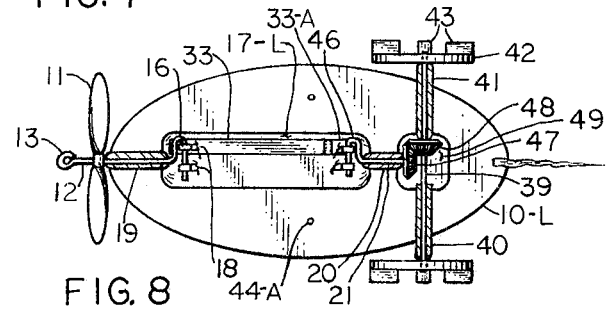
FIG. 8
*INVENTOR.*
HOMER I. HENDERSON.

United States Patent Office 3,505,753
Patented Apr. 14, 1970

3,505,753
ANIMATED FISHING LURE AND CHILD'S TOY
Homer I. Henderson, 2220 Live Oak,
San Angelo, Tex. 76901
Filed May 9, 1967, Ser. No. 637,103
Int. Cl. A01k 85/06
U.S. Cl. 43—26.2                                    3 Claims

ABSTRACT OF THE DISCLOSURE

An animated fish lure comprising a body having a cavity therein. In the cavity is a resilient member, preferably a rubber band, that can store torsional energy, as a "spring member." To the forward energy-input end of the spring is connected an input shaft, which is rotatable and extends through the front of the lure, and mounted on this shaft, external of the lure body, is a water propeller. When the lure is towed in water the propeller causes the shaft to turn and store torsional energy in the spring. A ratchet engages the propeller input shaft to prevent reverse rotation, i.e., unwinding of the spring. Operably connected to the rear or output end of the spring is a lure propelling means, as a flexible tail or paddle wheels, which propelling means is actuated by the energy stored in the spring and operates to slowly propel the lure in the same direction in which it was towed, even for several seconds after the towing stops.

---

This invention relates to lures used in sport fishing, especially those lures which imitate in size, shape, and action a particular fish food, such as an animal, or a minnow. More particularly it is a self-swimming lure being actuated by its incorporated propelling devices. The energy for self-propulsion is strain energy, which energy upon retrieving the lure in water, is automatically stored in an elastic medium. When the lure is retrieved, a water driven propeller mounted on the lure rotates and puts torque strain energy in an elastic medium. Upon resting from retrieve, the stored energy causes the lure's propelling means to operate, giving life-like action to the lure.

The realistic action of the lure makes it fascinating to children when they activate it with a short rod, as in a bath tub. Hence it does a dual useful service; a child's toy, as well as a lure. Of course if your own children are involved, you would probably wish to snip off the hooks, or put cork stoppers on them.

There are many recorded instances wherein the intelligence of game fish have been proven. One such is when a Texas State Fish Hatchery wished to transfer its brood fish from a brood tank. These fish had been protected all of their lives and had never seen a lure. They called in a noted sport fisherman to catch the fish. On his first cast he used a plug and it seemed that all the fish in the tank were fighting for it. This happened again and again. Thereafter the fish became more and more wary and showed less and less interest in striking the lure. They would rush at the lure when it landed on the water but would stop short of striking it. They would even follow close behind the lure all the way to the shore, seemingly scrutinizing it as the lure was being reeled in by an expert, in a manner to simulate a live minnow; but they refused to strike.

Scuba and skin diving equipment has permitted researchers to conduct considerable research on fishing. There are many published writings of their observations in waters that are fished. When a lure lands on the water, fish rise and give it the "once-over," close scrutiny, and only rarely strike. They even follow the lure as it is retrieved, always very close to the lure as if trying to make certain: is it a morsel to eat? or is it a vicious booby trap? Fish are not so dumb—the dumb ones of a given hatch are soon eliminated by larger fish, or man. The intelligent ones are left to propagate the species, therefore, each generation gets more and more intelligent as Mother Nature intended—the law of the survival of the fit.

In a conventional lure, the fish sees something that in performance is quite dissimilar to the prey of his past experiences. Fish particularly like an easy meal, such as a crippled minnow, a slow swimming mouse, or other easy-to-catch animal. These easy meals make a big commotion sculling the water backward with their tail or kicking the water backward with their feet, but not making much headway and no bow wave. The wise game fish may even know the formula expressing the physical law that the momentum of a floating body propelled forward is balanced by the momentum of the water pushed backward. In any event, the game fish does not see in nature an animal making a big bow wave without any water being pushed backward. When a game fish is chasing a hoped-for prey, he is accustomed to erratic turning by the prey to avoid him. Also, he gets water kicked in his face somewhat similar to an airplane in a dog flight; when one close on his opponents tail, he is in the turbulent propeller wash of the airplane he is pursuing.

Animated fish lures have heretofore been made having wind-up motors of rubber bands, or coiled springs. In these lures the energy was put in manually by the fisherman; that is, he wound up the motor before casting the lure. These lures were not too successful for several reasons. It was a nuisance to take a key and wind up the motor before each cast. The lures motor was almost run down by the time it hit the water, permitting very little time for fishing per cast. Some had trigger devices for releasing the wound-up motor atfer it was on the water, but even so, the fishing time was still short and the triggering devices were another added nuisance. With these lures the fisherman had no choice of the animation and rest periods, it was all animation until the wind-up motor was spent and then it was "dead" until the lure was recovered and rewound. In fishing, one wishes to control the time and place for his lure to animate and to rest, for instance, as the lure approaches a stump "hide-out" of Mr. Bass, he likes to animate the lure to attract the fish, then let it rest so Mr. Bass will have an easy meal. The lure of my invention circumvents the above insufficiencies.

In fishing parlance the word "retrieve" means to reel-in the lure, and not necessarily all the way—perhaps only a few feet. The word "rest" means to let the lure rest. For clarity these words will have this meaning in this specification and claims.

It is therefore the object of this invention to provide a fish lure that stores strain energy within itself when it is retrieved in water.

It is a further object of this invention to provide a fish lure that, upon resting, expends strain energy, stored within itself, and this energy actuates mechanism to animate itself.

A further object of this invention is to provide a child's toy wherein the child stores energy in the toy by towing it through water, and upon resting, the stored energy actuates mechanism in the toy to animate itself.

Another object of this invention is to provide a fish lure wherein the unnatural appendages are made invisible to fish.

Another object of this invention is to provide a fish lure having a propeller and incorporating a canted fin on its body to generate a lure body torque counter to the lure body torque generated by the propeller.

A still further object of this invention is to provide a fish lure, having available energy therein which drives sound generating mechanism.

Other objects and a fuller understanding of the invention may be had by referring to the following description and claims taken in conjunction with the accompanying drawings, in which:

FIG. 1 is an elevational view showing my invention embodied in a fish-like lure.

FIG. 2 is a vertical sectional view of FIG. 1.

FIG. 3 is a sectional view as seen by the cutting plane 3—3 of FIG. 2.

FIG. 4 is an elevational view of the tail assembly of FIG. 1.

FIG. 5 is a plan view of the tail assembly of FIG. 1.

FIG. 6 is a bottom plan view of FIG. 1 to show the anti-rotation-diving fin of FIG. 1.

FIG. 7 is an elevational view of the invention embodied in a leg-kicking animal-like lure, such as a mouse.

FIG. 8 is a plan view of the lower half of the lure of FIG. 7 showing the operating mechanism assembled.

Referring now to FIG. 1, this shows the invention in a lure resembling a fish. The body configuration is shown elliptical for simplicity, but the body configuration, coloring decoration, and fins (except the diving fin 35) are optional with the maker. The body 10 can be made to resemble practically any food fish of any water, and this is true also of the animal-like lures. FIG. 1 shows a wind-up propeller 11 secured (as by cementing) to a wire propeller shaft 12. The forward end of the propeller shaft 12 has an eye 13, to which is attached a swivel 14. The swivel should be a low friction swivel, such as a ball swivel. To the swivel is attached the fisherman's line 15. The lure carries a conventional fish hook 37, and may, if desired, have a conventional weedless spring wire 38. Extending from the rear of the body 10 is a rigid tail arm 24 which carries and actuates the semiflexible tail 23.

FIG. 2 is a vertical section showing the operating mechanism of the lure. As the lure is towed through the water the wind-up propeller 11 rotates the propeller shaft 12 in the low friction bow bearing 19. The interior end of the shaft 12 has a head 16 adapted to receive one or more rubber bands 18. The rubber bands 18 are as long as the body will permit and the rearward ends of the rubber bands are secured by loops to a head 46 of a wire crank shaft 21 mounted in a stern bearing 20. The rearward extension of the crank shaft 21 ends in a crank arm 22 having an eye to engage a crank 26 of the tail assembly as shown.

FIG. 4 and FIG. 5 show the tail assembly. The tail comprises a semiflexible section 23, secured between two identical plates 24, forming a tail arm. The vertical wire shaft 25 is also secured between the plates 24. This assembly of 23, 24 and 25 may be made by cementing as shown by 29. The aforementioned crank 26 has an eyelet 27 which rotatably engages a pin 28 in the forward end of the arm plates 24. The crank 26 is free to rotate on the pin 28 but is restricted from any lateral movement by the plates 24 and the pin 28. The pin 25 is rotatably mounted in the two vertical bearings 30 as shown in FIG. 2. Thus it is seen that the crank 26 is free to rotate (within limits) vertically but cannot rotate horizontally relative to the plates 24. The tail plates 24 are free to rotate horizontally (within limits) since the vertical shaft 25 rotates freely in the bearings 30. Hence, the crank arm 22 can rotate 360° with the vertical rotation of the crank 26 permitting the vertical component of rotation, while the horizontal rotation of the tail plates 24 together with the flexible tail 23, permits the horizontal component of the rotation of crank arm 22. Observed externally, one does not see the vertical rotation (really oscillation) of the crank 26 but does see the horizontal rotation (again oscillation) of the tail plates 24, together with the flexible tail 23. The flexible tail 23 should be of a material, thickness, and size to flex under this oscillation, and give the well-known tail effect of rearward acceleration of the water.

FIG. 2 and FIG. 3 show that the body 10 has cavities to accommodate the mechanism and the movements of the components. The body can be made of a light wood and carved to specifications. For economy, it is desirable to have the two body members, the upper 10–U and the lower 10–L, molded of a foamed plastic such as a foamed polyolefin. The members 10–U and 10–L usually will not be identical although some economy is gained by so doing. The configuration of fishes and animals are so different, top-half and bottom-half, that a good replica does not generally permit identical top and bottom members. It is only necessary that the two members have identical sections at the parting (or joining) plane. It is desirable that the parting plane be at the mid-point of the three cavities, 17–U, 17–L, and 31, 32. Each body member should have semicylindrical recesses to receive and nest the horizontal bearings 19 and 20. Each body member should have a bore hole to receive one of the vertical bearings 30. All bearings should be accurately placed in relation to the other components as shown. The various bearings may be of a low friction plastic tubing (such as polytetrafluorethylene polymer) and they may be cemented in place (as with epoxy cement). The two body members may be cemented together upon complete assembly.

FIG. 2 and FIG. 3 shows the cavity 17–U and 17–L enclosing the rotating heads 16 and 46. In the bottom of this cavity is cemented a long, thin and relatively-wide flat spring 33. This spring is offset at its rearward end as shown at 33–A. This offset end only is cemented to the bottom of the cavity near its rearward end, leaving a long vertically-flexible leaf spring extending forwardly and ending just forward of the head 16. Looking at FIG. 3, it is seen that the spring 33 is placed on the right-hand side of the cavity and that as the propeller rotates the head 16 clockwise, as shown by the arrow 36, the spring 33 offers very little resistance to the rotation of the head, since it is deflected vertically in which plane the spring has a low section modulus. Should a torque, such as the wound-up rubber 18, urge this head to rotate counterclockwise, one or the other end of the head 16 will contact the spring 33 at midpoint laterally of the cavity and place a horizontal force on the spring, in which plane it is quite rigid, and stops counterclockwise rotation. It will be noted that the spring 33 is placed near the right-hand wall of the cavity 17, so that a slight to-the-right deflection (laterally) of the spring causes it to strike the wall of the cavity which stops further deflection. The spring and head act as a one-way ratchet. It is important that the spring be so placed that when the head 16 rotates counterclockwise it contacts the spring when the head is vertical. Since the face of the spring is horizontal there is then neither upward or downward force on the spring. It is desirable that the spring and all other components be water resistant.

The cavity 31 is a conical cavity to accommodate the rotating cranks 22 and 26.

The cavity 32 is a backwardly flared cavity to accommodate the horizontal oscillations of the tail arm 24.

As the propeller 11 rotates upon being towed, it winds up the rubber band and through it places a torque on the body 10 to rotate with the propeller. A fin canted to give a counter torque is desired, otherwise there would be little strain energy stored in the rubber. This lure is found to be effective as a surface lure, hence the use of foamed plastic for lightness. It is not, however, restricted to a surface lure. The effectiveness of the propeller 11 is increased when it is completely submerged. To accomplish submergence in a floating lure, a diving-scoop is desired. A single fin 35 is provided to accomplish both functions; that is to generate a torque counter to that of the propeller, and to cause the lure to dive when it is towed. This fin 35 is shown in FIGS. 1, 2, 3, 6 and 7. The leading edge of the fin is so shaped that it will not hang on small limbs, but will be cammed over them.

It is desirable that a lure assume the right position in the water. This is easily accomplished by a properly placed weight, or weights, represented as a single weight 34. This weight may be placed, and secured as by cement, in a small cavity in the bottom of the lure so that the lure floats upright and offers some resistance against body rotation. The weight is placed in a fore-aft position to give the desired attitude to the lure. In a fish-like lure, for instance, it may be desired that the lure float with its mouth a the surface of the water with its body sloping downward toward the tail to represent an easily caught minnow gasping at the water's surface for oxygen-enriched water (a sight too often seen today).

In using this fish lure the fisherman casts the unwound lure as far out as practical. When the lure lands on the water he can let it rest for a few seconds, hoping for a strike, or he can immediately wind-up the rubber band by a backward sweep (three to seven feet) of his fishing rod. This winds up the rubber band due to the fact that the tail is of such an area that it cannot, in water, unwind the rubber band as rapidly as the propeller winds it up. In air it does unwind as rapidly as one can spin the propeller. However, in water the resistance to movement of a blade-like tail varies with the area of the blade and its velocity squared. True, there is some slow tail wagging during the time that the propeller is winding up the rubber but the number of oscillations is negligible. After the backward sweep of his rod the fisherman should "rest" the lure, i.e., let it come to the surface and put on its "act" of simulated swimming. This act will last for several seconds or until the rubber is unwound and the fisherman should be alert for a strike. When the lure is run-down he can rewind it by another backward sweep of his rod. He should continue to sweep and rest, sweep and rest, until the lure is reeled in. If one casts downward, he can permit the lure to float away from him during "rest" and thereby continue retrieving-rest indefinitely.

FIGS. 7 and 8 depict a similar lure, but the embodiment shows a mouse-like lure. This lure is analogous to the fish-like lure above. Starting with the propeller and going rearward the mechanism and cavity 17 are exactly the same as the fish-resembling lure. This exactness stops at the rear end of the crank shaft 21 which does not end in a crank arm 22, as above, but does end with a gear 47 cemented on it, with the gear positioned to bear against the end of bearing 20. The gear 47 engages a similar gear 48, on a horizontal wire shaft 39. These gears may be bevel, miter, or rod gears. They are preferably molded of plastic as the torque is low. The gears are in the cubical body cavity 49, as shown. The shaft 39 extends laterally across the body 10 within the bearings 40 and 41. Upon each end of the wire shaft 39 is cemented a disk 42, which disk has one or a plurality of paddles 43 as shown. The mouse body is designed so that it floats with the shaft 39 just above the water surface 44. Thus it will be recognized that upon rotation of the shaft 39, the lower submerged paddles 43 act similar to a "paddle river boat," to propel the lure forward. The paddles also roughly simulate the legs of a swimming animal in generating water commotion, noise, and slow forward erratic progress. The lure can be made to act more erratically by placing the paddles out of phase.

Should the mouse be towed with the shaft 39 above the water's surface, the submerged paddles 43 would be actuated to unwind the rubber band substantially as rapidly as the propeller 11 would wind-up the rubber band. However, when the lure is submerged, the upper and lower paddles 43 generate counter and offsetting torques due to the towing per se. The torque of the rubber band tends to rotate the disks 42 when completely submerged. However, the area of all the paddles 43 is too great to permit them to rotate at a speed comparable with the speed of rotation of the propeller 11, due to the fact that the force required is proportional to the velocity squared. This permits the propeller 11 to wind-up the rubber bands and this strain energy is available when the lure is allowed to surface and rest, whereupon only the lower paddles are in the water and the disk rotates relatively slowly compared to the rapid wind-up of the propeller.

It will be obivous that in place of the disk 42, and paddles 43, one could use a hub 42 with one or more paddles 43 extended therefrom. It is necessary, however, that upon being towed the above-shaft paddle or paddles be opposed equally by a below-shaft paddle or paddles.

The two body valves can be secured, one to the other, with cement or by screws 45 in screw holes 44, as shown.

The operation of this mouse-like lure is analogous to the fish-like lure operation.

The items—propeller 11, fin 35, and the rotor disks 42—may be made of opaque material. I prefer, however, to make them of a clear plastic having enough flexibility to insure against breaking. When these are made of clear material they are invisible when submerged. The game fish does not see whirling propellers, or rotating disks, or dive-scoops in nature, and therefore the fish is less wary if these items are invisible. Even the tail 23 can be made of a clear, tough plastic, such as Mylar, to make the lure body appear shorter. The body movement of the lure still has that realistic side-to-side motion of a crippled minnow, even though the wagging tail itself is not seen.

The design of this lure is dependent upon the size of the lure desired. The size of the propeller is pretty much determined by the size of the lure. The cross sectional area of the rubber, and the size of the fin 35 is determined by the propeller size. The rubber should be the smallest size that will not fail in torque when the lure is retrieved at high speed. The area of lure-propelling surfaces should be sufficiently large so that they cannot follow the wind-up propeller speed during wind-up, and to insure a slow, (hence, long-time) unwind. The amount of energy storable is dependent upon the volume of rubber, consequently it should be as long as the lure permits. I find better performance with two spaced rubber bands, over one wide band.

Scuba divers report that tests indicate that fish are scared by loud noises, but are attracted by certain low intensity staccato sounds which resemble the distress calling of chirping, clacking, clicking, chattering noises made by small animals, birds, and bugs that have fallen into the water. The tail-wagging, slow-moving embodiment of this invention can be made to produce a staccato, clacking sound by providing backlash in the cranks-bearing-tail assembly, there being a pulse with each reversal of the tail. The intensity of the noise increases with increase of the backlash, and it does seem to attract fish. The slow turning gear-kicking legs embodiment of this invention is made to produce a chattering noise by making the gear's relative mounting distance excessive. A sound generating reed can be placed in the cavity 17, to be plucked by the rotating head 46, analogous to spring 33 and head 16, with a round spring.

The conventional fish fins, such as dorsal and anal fins, as well as mouse tail, etc., can be cemented in slots in the lure's body.

It will be obvious that the propeller 11 need not necessarily be only partly submerged when the lure is floating. This propeller can be placed lower relative to the lure's body, even if it requires deepening the lure's body, so that it is always submerged even though the back of the lure is above water. In which case a dive-scoop is not needed, but the anti-rotation fin is still desirable.

To use the fish-like lure of this invention as a sinking lure one needs to only increase the amount of the weight 34 until the lure sinks. An additional weight can be provided for this purpose, so that a fisherman has the option of a sinking or a floating lure merely by using the large or the small weight 34. Or, of course, an additional weight can be added.

Should one wish to restrict a lure to a sinking type lure, he can build a lure body of higher density material so that it sinks. In which case, the dive scoop may not be desirable. Generally, in a deep-running lure one wants a slow-moving, bottom-gouging lure to attract the fish. In this case, the no-hang dive scoop is advantageous.

To use the paddle-wheel lure on bottom, the paddles are not needed, but the disks 42, need to be of sufficient diameter to roll on the bottom like wheels, or one can use a hub with long spokes.

The fishing of a sinking lure is similar to that of the surfacing lure. After casting one retrieves and rests, retrieves and rests, until the lure is recovered.

It is obvious that in place of rubber as a strain storing material one could use any of the elastomers or metal springs.

Children normally get a "big bang" out of these animated lures, as they do with all realistic animations. They often play with one for hours in a bath tub. This device is easy to wind with a one-foot-long wire rod. When wound up, it will go into an erratic forward motion for several seconds as the rubber unwinds. This can be repeated time and time again. When used solely for a toy, the body can be made to resemble any of a large number of things, such as a boat, a mermaid, a whale, or "Flipper," and the size may be many times larger than a fish lure. Also, the propeller 11 can be placed under the water's surface when the toy is floating so that the toy can be rewound without submerging it. In which case a dive scoop is not needed, only a counter-rotation device such as excessive bottom weight, or a canted fin. Of course the hooks and hook-guard should be eliminated.

I claim:
1. An animated fish lure or child's toy, for use in water, comprising:
   a body having a cavity therein,
   a spring member within said cavity,
   a propeller on the forward end of said body, and so mounted as to rotate when the body is towed in water,
   said propeller rotatively connected to the input end of said spring member to wind same when the propeller rotates storing strain energy in said spring member,
   a towing line swivelly attached to a forward extension of said propeller to tow said body,
   ratchet means to prevent said propeller from rotating in a direction to unwind said spring member,
   body propelling means mounted on said body and connected to the output end of said spring member, and actuated thereby to give life-like animation to said body,
   said body propelling means having an area and sweep sufficiently large that it releases spring energy at a time rate lower than the time rate at which the propeller stores energy.

2. A water traversing member comprising:
   a body having a cavity therein,
   a towing line attached to said body,
   a spring member in said cavity in said body operable when twisted to store torsional energy,
   a drive output member rotatably mounted in said body and connected to the rear or output end of said spring member,
   body-propelling means operably connected to said drive output member, and adapted to propel the body forwardly,
   a drive input member rotatably mounted in the forward end of said body and connected to the input end of said spring member, and
   a propeller screw mounted externally of said body on said drive input member and adapted to generate a torque when towed through water, thereby storing torsional energy in said spring member,
   ratchet means operably associated with said drive input member to prevent reverse rotation thereof,
   said ratchet means comprising laterally projecting portions on said drive input member disposed within said cavity, a flat spring having one end fixed to the body within said cavity, and the opposite end free and positioned adjacent to said projecting portions in an off-center relationship whereby during wind-up rotation and projecting portions contact the said flat spring to deflect it in a plane of low rigidity, and in counter rotation said projecting portions contact the spring to deflect it in a plane of high rigidity.

3. A water traversing member comprising:
   a body having a cavity therein,
   a towing line attached to said body,
   a spring member in said cavity in said body operable when twisted to store torsional energy,
   a drive output member rotatably mounted in said body and connected to the rear or output end of said spring member,
   body-propelling means operably connected to said drive output member, and adapted to propel the body forwardly,
   a drive input member rotatably mounted in the forward end of said body and connected to the input end of said spring member, and
   a propeller screw mounted externally of said body on said drive input member and adapted to generate a torque when towed through water, thereby storing torsional energy in said spring member,
   ratchet means operably associated with said drive input member to prevent reverse rotation thereof,
   said drive output member comprises a longitudinal shaft,
   said body propelling means comprises a transverse shaft rotatably mounted on said body, with motion-transmitting means for driving said transverse shaft from said longitudinal shaft, and at least one paddle wheel mounted on said transverse shaft and adapted to engage the water.

References Cited

UNITED STATES PATENTS

| 1,521,090 | 12/1924 | Goble | 43—26.2 |
| 2,691,235 | 10/1954 | Pcola | 43—26.2 |
| 978,290 | 12/1910 | Heatly | 43—26.2 |
| 1,442,332 | 1/1923 | Frament | 43—26.2 X |
| 1,801,579 | 4/1931 | Sunday | 43—26.2 |
| 2,065,337 | 12/1936 | Lee | 46—92 |
| 2,917,859 | 12/1959 | Troyer | 43—26.2 |
| 2,999,329 | 9/1961 | Pankuch | 43—26.2 |
| 3,077,698 | 2/1963 | Glass et al. | 46—92 |

SAMUEL KOREN, Primary Examiner

D. J. LEACH, Assistant Examiner

U.S. Cl. X.R.

43—42.31; 46—92